United States Patent [19]

Ungchusri et al.

[11] Patent Number: 5,676,348
[45] Date of Patent: Oct. 14, 1997

[54] ASYMMETRIC SEAL SEGMENT CONFIGURATION

[75] Inventors: Tep Ungchusri, Woodlands; Roy C. Bates, Crosby; Michael E. Wilson, Jr., Spring, all of Tex.

[73] Assignee: FMC Corporation, Chicago, Ill.

[21] Appl. No.: 662,172

[22] Filed: Jun. 12, 1996

[51] Int. Cl.$^6$ ................................................ F16K 5/14
[52] U.S. Cl. ........................ 251/316; 251/309; 251/363
[58] Field of Search ................................ 251/172, 309, 251/363, 316, 317

[56] References Cited

U.S. PATENT DOCUMENTS

| | | | |
|---|---|---|---|
| 3,061,267 | 10/1962 | Hamer | 251/317 X |
| 4,017,088 | 4/1977 | Lerjen | 277/53 |
| 4,113,228 | 9/1978 | Frye | 251/172 X |

*Primary Examiner*—John Fox
*Attorney, Agent, or Firm*—Henry C. Query, Jr.

[57] ABSTRACT

A valve comprising a body having an interior cavity, an inlet port and an outlet port; an upstream seat and a downstream seat positioned within the cavity, each seat including a bore in alignment with the inlet and outlet ports to define a flow passage through the valve body; a closure member movably positioned between the seats to either open or close the flow passage; a seat-to-closure member seal defined between each seat and the closure member, the seat-to-closure member seal defining a first area between the seat-to-closure member seal and the bore of the upstream seat; wherein the upstream seat includes a sealing member between the seat and the valve body which is positioned asymmetrically around the bore; and wherein the sealing member defines a second area between the sealing member and the bore which is larger than the first area.

2 Claims, 5 Drawing Sheets

ASYMMETRIC SEAL SEGMENT CONFIGURATION

FIELD OF THE INVENTION

1. Field of the Invention

This invention relates to valves such as plug valves, gate valves and ball valves which include a closure member that is selectively positioned between two seal segments or seats to either open or close a fluid flow passage through the valve. More particularly, the invention relates to seal segments or seats for use in such valves which comprise a seal positioned asymmetrically around the flow passage.

2. Description of Related Art

Plug valves, gate valves and ball valves are similar in that they each comprise a valve body having an internal cavity, inlet and outlet ports in communication with the cavity, and a pair of seal segments or seats positioned within the cavity and each including a bore in alignment with the inlet and outlet ports to define a flow passage through the valve body. The valves also comprise a closure member, such as a plug, gate or ball, which is movably positioned between the seats to either open or close the flow passage. In addition, each seat typically includes a sealing member between the seat and the valve body surrounding the flow passage to prevent fluid from entering the cavity between the valve body and the seats.

When the flow passage is closed, pressure from fluid upstream of the closure member will force the closure member against the downstream seat, which in turn will be forced against the valve body. In this condition, the downstream seat and closure member form a seat-to-closure member seal that closes off the flow of fluid. Also, in the closed condition pressure in the valve cavity tends to force the upstream seat against the closure member, thereby forming a seat-to-closure member seal between these members. This pressure can lock the seat against the closure member and make the valve difficult to open.

When fluid upstream of the valve is then bled off, pressure can become trapped in the cavity between the sealing member and the seat-to-closure member seal. This trapped pressure is undesirable because it can overpressurize the valve cavity if it is heated and can unexpectedly vent during servicing and expose personnel to hazardous fluid. This pressure can also lock the upstream seat against the closure member and consequently make the valve very difficult to open.

Certain prior art valves address this problem by providing each seat with two sealing members. One seal is sized and positioned near the flow path to block fluid from entering the cavity between the upstream seat and the closure member. This prevents the upstream seat from sealing against the closure member, which permits fluid to enter the cavity between the seat and the closure member to equalize the cavity pressure with the upstream pressure. The second seal is sized and positioned near the periphery of the seat to prevent fluid in the cavity from becoming trapped between the seat and the valve body when fluid upstream of the valve is bled off. Such an arrangement is disclosed in U.S. patent application Ser. No. 08/384,726, which is owned by the assignee hereof.

SUMMARY OF THE INVENTION

It is an object of the present invention to provide a valve having a pair of seats which each include a single sealing member between the seat and the valve body. It is a further object of the invention to provide such a valve which is capable of preventing the upstream seat from forming a seat-to-closure member seal between the upstream seat and the closure member when the valve is closed and preventing fluid from being trapped between the upstream seat and the valve body when fluid upstream of the valve is bled off.

According to the present invention, these and other objects and advantages are achieved by providing a valve comprising a valve body having an interior cavity, an inlet port and an outlet port; a pair of seal segments or seats positioned within the cavity, each seat including a bore in alignment with the inlet and outlet ports to define a flow passage through the valve body; and a closure member movably positioned between the seats to either open or close the flow passage, wherein at least the upstream seat includes a sealing member between the seat and the valve body which is positioned asymmetrically around the bore, and wherein the effective sealing area between the sealing member and the flow passage is greater than the effective sealing area between the seat-to-closure member seal and the flow passage.

According to the present invention, when the valve is closed, fluid acting between the body and the upstream seat will encounter the sealing member and, because the sealing member is asymmetric to the flow passage, create a non-uniform force on the seat which in turn will generate a non-uniform stress distribution between the seat and the closure member. This non-uniform stress distribution will bias the fluid to enter the cavity between the seat and the closure member at the lower-stressed area, thereby preventing a seat-to-closure member seal from forming and allowing the cavity and upstream pressures to equalize. As the upstream fluid is bled off, the pressure differential across the closure member will be reduced and the pressurized fluid within the cavity will attempt to exit the cavity between both the seats and the closure member and the seats and the valve body. However, since the effective sealing area between the seats and the valve body is larger than the effective sealing area between the seats and the closure member, a differential pressure across the seats will exist that will force the seats against the valve body and allow the fluid to escape between the seats and the closure member, thereby preventing fluid from being trapped between the upstream seat and the valve body.

These and other objects and advantages of the present invention will be made apparent from the following detailed description, with reference to the accompanying drawings.

DETAILED DESCRIPTION OF THE PREFERRED EMBODIMENTS

While the present invention will be described with reference to a plug valve, it should be understood that the invention applies to any type of valve which comprises a closure member positioned within a valve body cavity between two seal segments or seats. Thus, the invention can be used in conjunction with gate valves and ball valves, among others.

Figure 1:
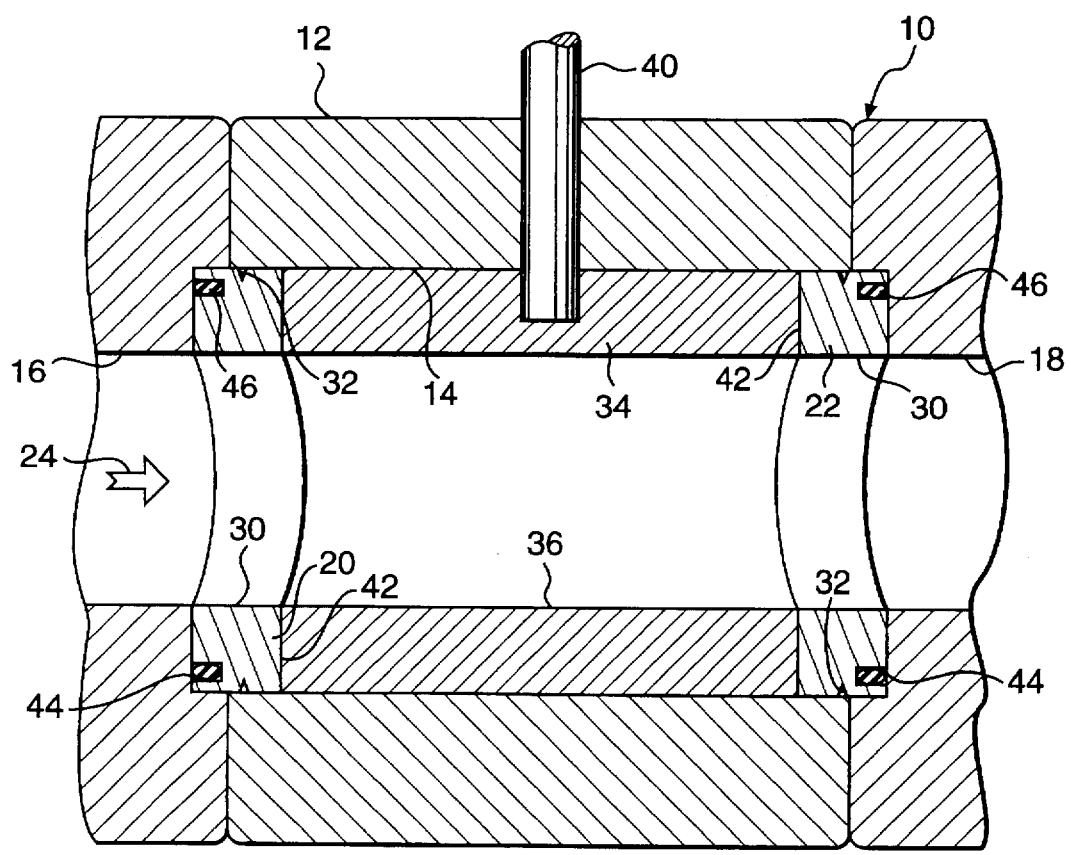
FIG. 1 is a partial cross-sectional elevation of a plug valve according to the present invention.
Figure 2:
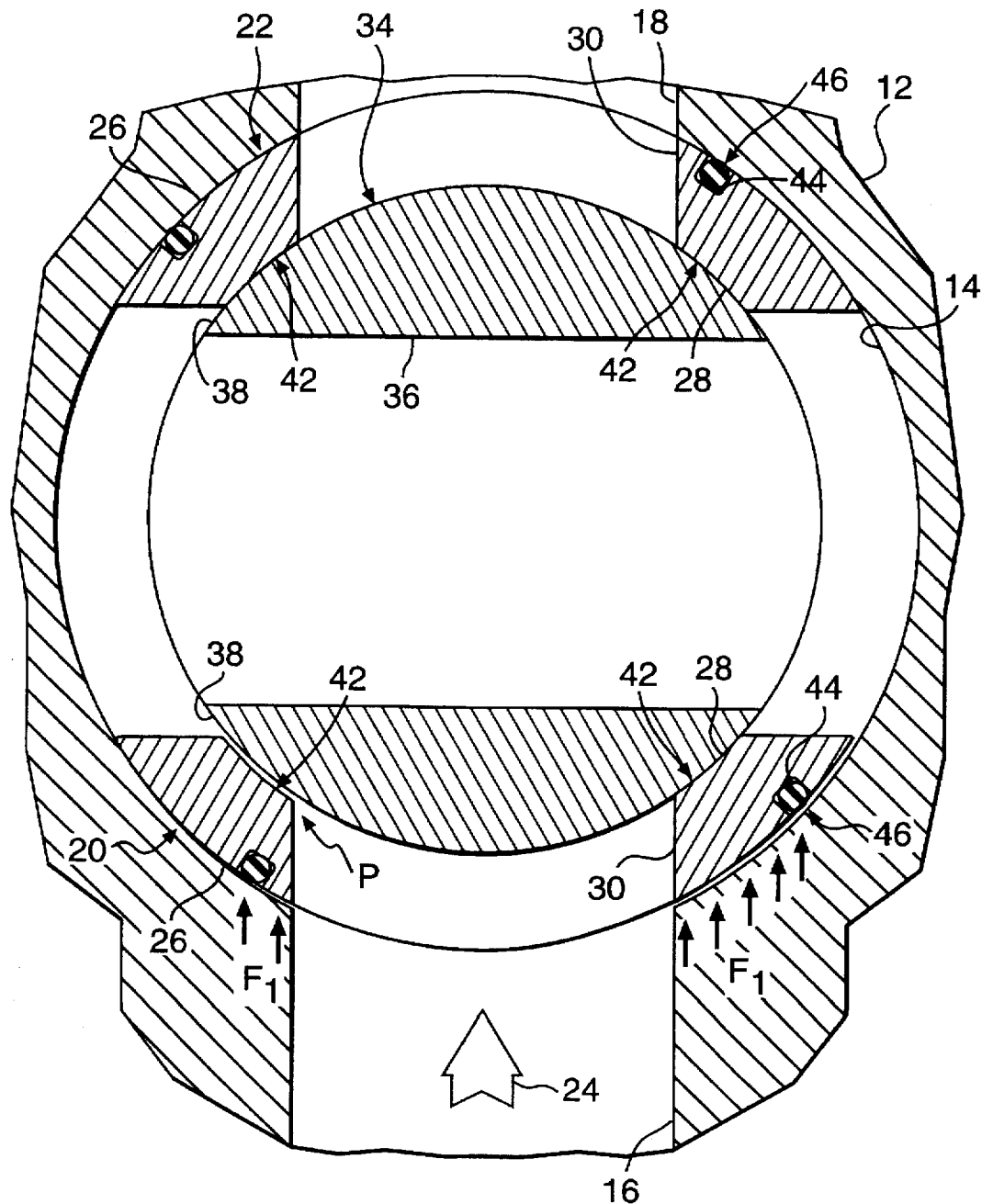
FIG. 2 is a partial cross-sectional top view of the valve shown in FIG. 1.

Referring to FIGS. 1 and 2, a plug valve according to the present invention, indicated generally by reference number 10, is shown to comprise a valve body 12 having a cylindrical interior cavity 14 and inlet and outlet ponds 16 and 18, respectively, in communication with cavity 14. Valve 10 also comprises an upstream seal segment or seat 20 and a downstream seal segment or seat 22. The designations "inlet" and "outlet" for the ponds 16, 18 and "upstream" and "downstream" for the seats 20, 22 are made in relation to the direction of fluid flow indicated by the arrow 24. Each seat 20, 22 includes an arcuate outer surface 26 for cooperating with cylindrical cavity 14, an arcuate inner surface 28 and a bore 30 which is aligned with the respective inlet and outlet ponds 16, 18 to form a flow passage through valve 10. In addition, each seat 20, 22 may include a notch 32 or similar indicia on its top and bottom surfaces for use in orienting seats 20, 22 during assembly.

Valve 10 further comprises a closure member, such as a plug 34, movably positioned within cavity 14 between seats 20, 22. Plug 34 comprises a throughbore 36 and an annular outer surface 38 for cooperating with the inner surfaces 28 of seats 20, 22. Valve 10 comprises a stem 40 which can be turned by any suitable means to rotate plug 34. When plug 34 is positioned as shown in FIG. 1, throughbore 36 is aligned with bores 30 and the flow passage through valve 10 is open. When plug 34 is positioned as shown in FIG. 2, throughbore 36 is out of alignment with bores 30 and the flow passage is closed.

Although plug 34 is preferably sized so that a slight clearance exists between plug 34 and seats 20, 22, a potential seat-to-plug seal 42 exists between plug 34 and each seat 22, 24. This potential seal forms an actual seal in certain operating conditions of valve 10, as will be described below. Seat-to-plug seal 42 forms a generally ring-shaped closed curve surrounding throughbore 36, although in certain applications the exact shape of seat-to-plug seal 42 is difficult to predict.

Figure 3:
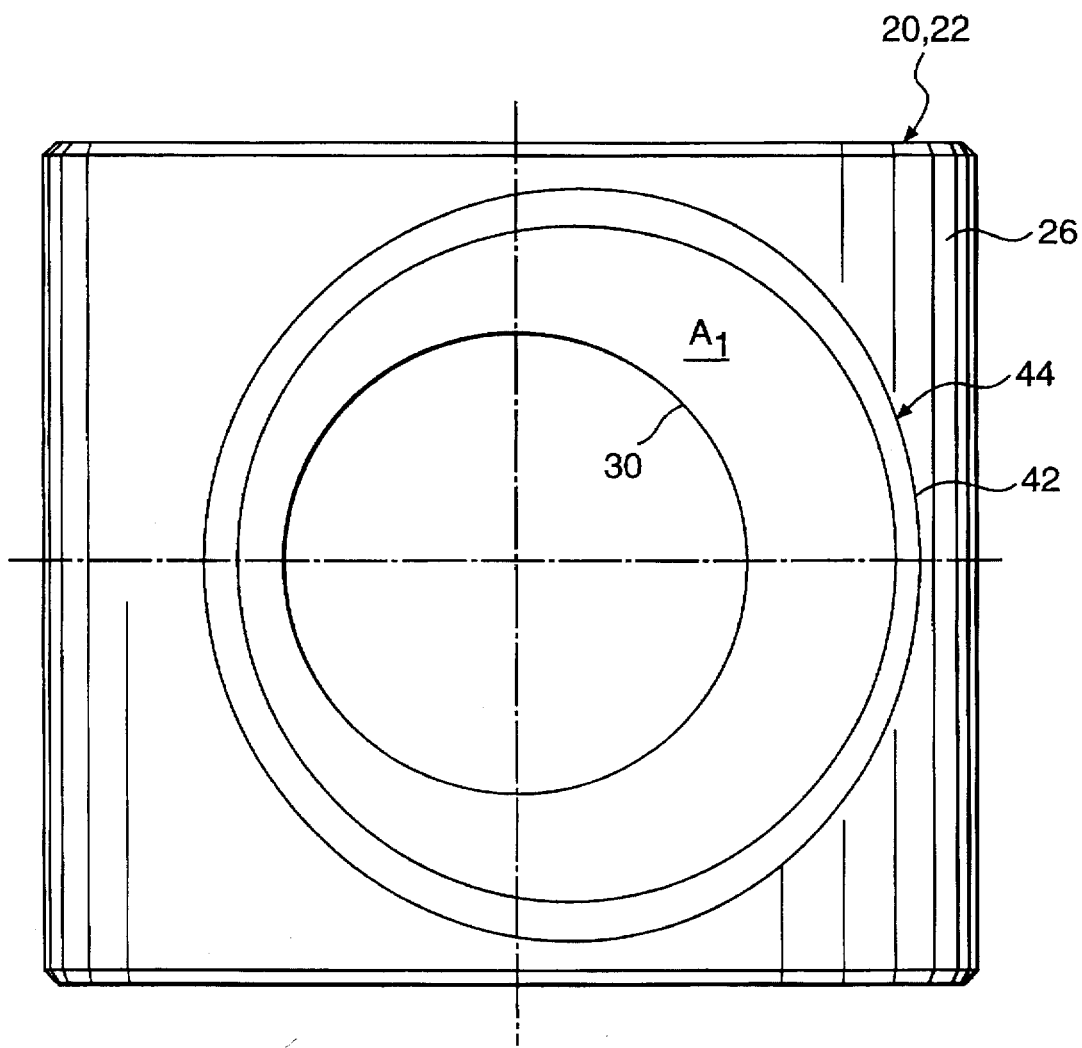
FIG. 3 is a side elevation of the seat portion of the valve depicted in FIGS. 1 and 2.
Figure 4A:
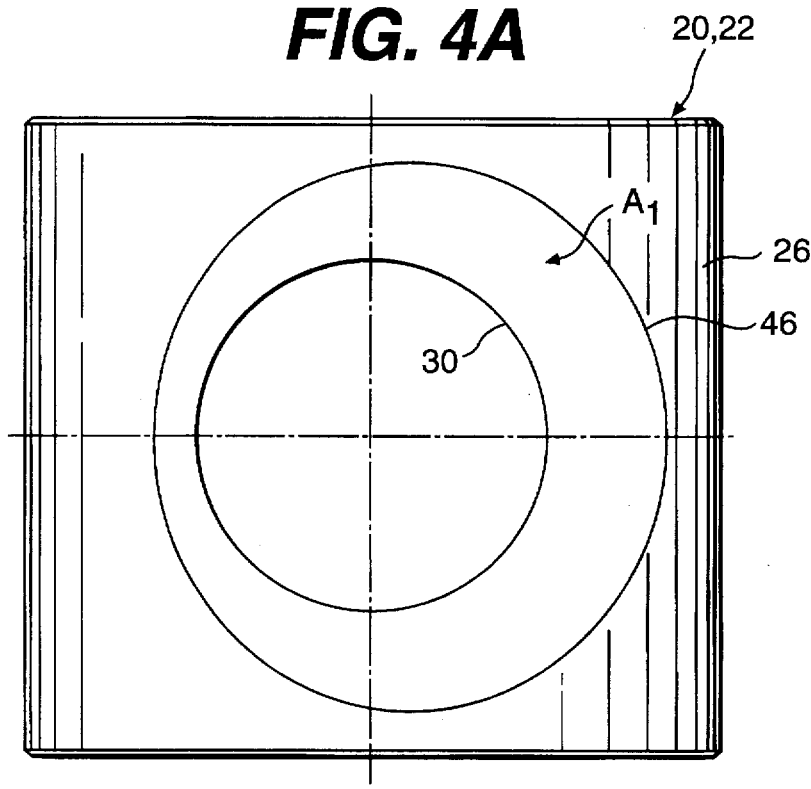
FIG. 4A is a side elevation of the seat depicted in FIG. 3 with a representation of the effective sealing area between the seat and the valve body.
Figure 4B:
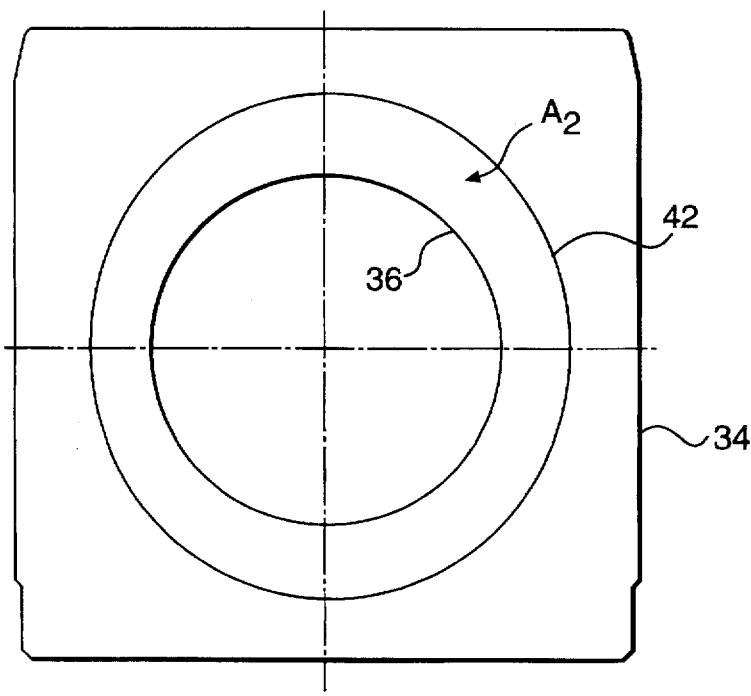
FIG. 4B is a side elevation of the plug portion of the valve depicted in FIGS. 1 and 2 with a representation of the effective sealing area between the seat and the plug.

In accordance with the present invention, each seat 20, 22 includes a groove 44 formed on its outer surface 26. Positioned within each groove 44 is a sealing member or seal 46 for sealing between the outer surface 26 and the valve cavity 14. Referring to FIGS. 2 and 3, each groove 44 surrounds and is formed asymmetric to bore 30. In addition, the size of groove 44 is selected such that the area $A_1$ bounded by seal 46 and bore 30 on outer surface 26 of seats 20, 22 (FIG. 4A) is larger than the area $A_2$ bounded by seat-to-plug seal 42 and throughbore 36 (FIG. 4B), which is the same area bounded by seat-to-plug seal 42 and bore 30 on inner surface 28 of seats 20, 22. Within the above design constraints, groove 44 and seal 46 can be of many configurations, including, but not limited to, square, rectangular, circular and oval.

Figure 5A:
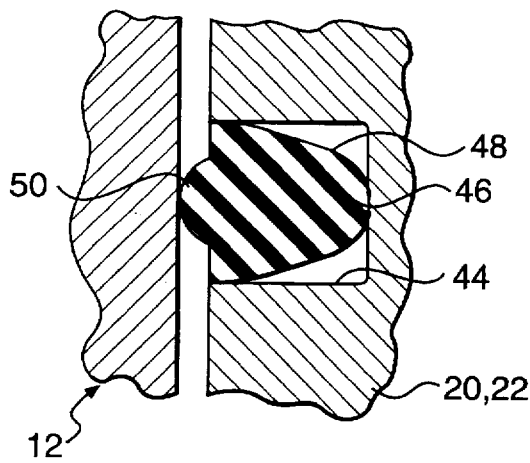
FIGS. 5A through 5C are cross-sectional views of three embodiments of sealing members suitable for use in the present invention.
Figure 5B:
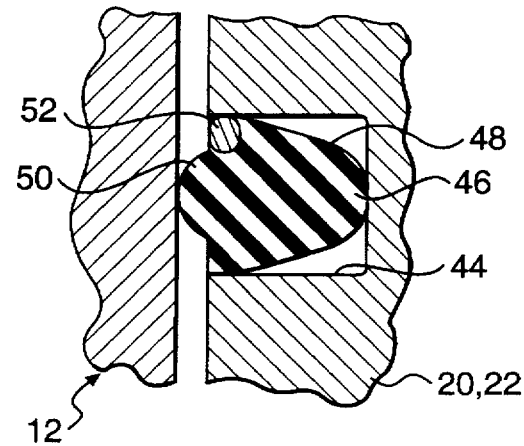
Figure 5C:
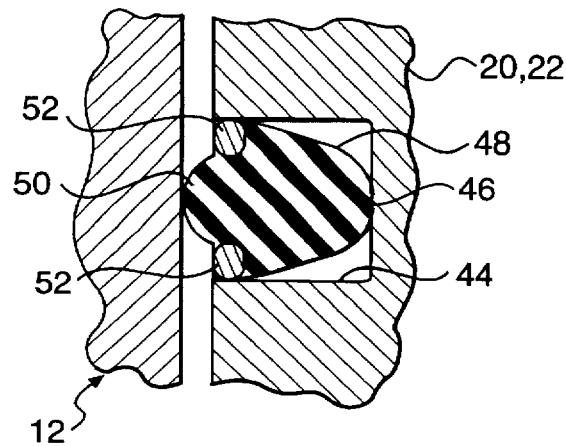

Seal 46 is preferably made of an elastomeric material, such as nitrile or HNBR, and can have various cross sections. A suitable seal 46 is an O-ring. Referring to FIG. 5A, another suitable seal 46 is shown in cross section to comprise a base section 48 generally confined within groove 44 and a convex portion 50 extending from base section 48 toward valve body 12. The area of base section. 48 is preferably less than the area of groove 44. Referring to FIGS. 5B and 5C, seal 46 may also comprise one or two anti-extrusion members or springs 52 formed within seal 46 at the intersection of base portion 48 and the edge of groove 44.

In operation of valve 10, when plug 34 is turned to close the flow passage, as shown in FIG. 2, the pressure exerted on plug 34 by the fluid upstream of valve 10 will force plug 34 against the downstream seat 22, creating a seat-to-plug seal 42 between plug 34 and seat 22. Preferably, plug 34 and seats 20, 22 are made of metal, and seat-to-plug seal 42 will therefore be a metal-to-metal seal. The force against seat 22 will in turn force seat 22 against body 12, which will cause seal 46 to compress and seal against body 12. Seat-to-plug seal 42 and seal 46 create a sufficient sealing effect to escaping past valve 10.

When valve 10 is closed, pressurized fluid upstream of plug 34 will attempt to enter cavity 14 between body 12 and the upstream seat 20 and between seat 20 and plug 34. The fluid acting between body 12 and seat 20 will encounter seal 46 and, because seal 46 is asymmetric to the flow passage, create a non-uniform force $F_1$ on seat 20 which will drive seat 20 toward plug 34 non-uniformly. The non-uniform force $F_1$ applied to the generally uniform area $A_2$ of plug 34 (FIG. 4B) generates a non-uniform stress distribution between seat 20 and plug 34. Fluid attempting to enter cavity 14 between seat 20 and plug 34 will be biased to enter cavity 14 between seat 20 and plug 34 at the lower-stressed area, thereby preventing the formation of a seat-to-plug seal 42 and allowing the pressure in cavity 14 to equalize with the pressure upstream of valve 10. As a result, no undue force will be required to turn plug 34 between the closed and open positions.

As the pressurized fluid upstream of valve 10 is bled off, the pressure differential across plug 34 will be reduced and the pressurized fluid within cavity 14 will attempt to exit cavity 14 both between seats 20, 22 and plug 34 and between seats 20, 22 and valve body 12. However, since the effective sealing area $A_2$ between seats 20, 22 and valve body 12 is larger than the effective sealing area $A_2$ between seats 20, 22 and plug 34, a differential pressure across seats 20, 22 will exist that will force seats 20, 22 against valve body 12 and allow the fluid to escape between seats 20, 22 and plug 34, thereby preventing fluid from being trapped between seats 20, 22 and valve body 12. Therefore, there is little risk that personnel will be exposed to hazardous fluid during servicing of valve 10 or that cavity 14 will become overpressurized if valve 10 is heated.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A valve comprising:
  a body having an interior cavity, an inlet port and an outlet port;
  an upstream seat and a downstream seat positioned within the cavity, each seat including a bore in alignment with the inlet and outlet ports to define a flow passage through the valve body;
  a closure member movably positioned between the seats to either open or close the flow passage;
  a seat-to-closure member seal defined between each seat and the closure member;
  wherein the seat-to-closure member seal between the upstream seat and the closure member defines a first area between the seat-to-closure member seal and the bore of the upstream seat;

wherein the upstream seat includes a sealing member between the seat and the valve body which is positioned asymmetrically around the bore; and wherein the sealing member defines a second area between the sealing member and the bore which is larger than the first area.

2. A valve comprising:

a body having an interior cavity, an inlet port and an outlet port;

an upstream seat and a downstream seat positioned within the cavity, each seat including a bore in alignment with the inlet and outlet ports to define a flow passage through the valve body;

a closure member movably positioned between the seats to either open or close the flow passage;

a seat-to-closure member seal defined between each seat and the closure member;

wherein each seat-to-closure member seal defines a first area between the seat-to-closure member seal and the bore of each seat;

wherein each seat includes a sealing member between the seat and the valve body which is positioned asymmetrically around the bore; and wherein the sealing member defines a second area between each sealing member and the bore which is larger than the first area.

* * * * *